United States Patent [19]

McClaughry et al.

[11] 4,302,845
[45] Nov. 24, 1981

[54] PHASE-ENCODED DATA SIGNAL DEMODULATOR

[75] Inventors: Michael J. McClaughry, Cary; John P. Byrns, Hoffman Estate, both of Ill.

[73] Assignee: Motorola, Inc., Schaumburg, Ill.

[21] Appl. No.: 119,350

[22] Filed: Feb. 7, 1980

[51] Int. Cl.³ .................. H03D 3/18; H04L 27/22
[52] U.S. Cl. ................................ 375/82; 375/120; 375/83; 328/133
[58] Field of Search .............. 370/100; 375/80, 81, 375/82, 83, 87, 110, 120; 360/40, 42, 43, 51; 328/72, 74, 133; 371/42; 455/33, 38, 54; 329/110; 307/232; 340/170

[56] References Cited

U.S. PATENT DOCUMENTS

| | | | |
|---|---|---|---|
| 3,766,316 | 10/1973 | Hoffman et al. | 375/116 |
| 3,801,956 | 4/1974 | Braun et al. | 340/146.2 |
| 3,840,821 | 10/1974 | Conway | 331/14 |
| 3,855,576 | 12/1974 | Braun et al. | 340/146.2 |
| 3,859,631 | 1/1975 | Holmes et al. | 375/87 |
| 3,883,817 | 5/1975 | Cliff | 331/1 A |
| 3,927,260 | 12/1975 | Amundson et al. | 179/1 MN |
| 3,980,824 | 9/1976 | Lamb et al. | 375/56 |
| 4,029,900 | 6/1977 | Addeo | 328/155 |
| 4,080,572 | 3/1978 | Hastings et al. | 328/115 |
| 4,088,832 | 5/1978 | Eastmond | 375/87 |
| 4,144,411 | 3/1979 | Frenkiel | 455/33 |
| 4,145,683 | 3/1979 | Brookhart | 371/42 |
| 4,157,573 | 6/1979 | Aghazadeh | 360/51 |
| 4,167,760 | 9/1979 | Decker | 360/40 |
| 4,215,430 | 7/1980 | Johnson, Jr. | 360/51 |

*Primary Examiner*—Benedict V. Safourek
*Attorney, Agent, or Firm*—Rollie Hackbart; James W. Gillman

[57] ABSTRACT

A demodulator is described for demodulating phase-encoded data signals transmitted on a noisy communication channel, such as, for example, radio communication channels of a radio communication system. The demodulator includes a digital phase-locked loop for phase-locking to the mid-bit transitions of the phase-encoded data signal, which, in the preferred embodiment is encoded according to the well known Manchester coding format, and further includes demodulating circuitry for sampling the phase-encoded data signal a predetermind number of times, weighting the samples according to predetermined weighting factors, totalizing the weighted samples for each bit interval and comparing the totalized samples to a predetermined threshold value for ascertaining the logical state of each bit of the phase-encoded data signal. For example, if the magnitude of the totalized samples is greater than or equal to the threshold value, a logical one state may be provided for the decoded data signal, and, if the magnitude of the totalized samples is less than the threshold value, a logical zero state may be provided for the decoded data signal. In preferred embodiments of the present invention, the weighting factors assigned to each sample may be either binary weighted or sine weighted, although any suitable weighting factors may be utilized depending on the characteristics of the phase-encoded data signal. The phase-encoded data signal demodulator embodying the present invention is particularly well adapted for demodulating high speed, phase-encoded data signals transmitted over radio channels to mobile and portable stations of a radio communication system.

14 Claims, 8 Drawing Figures

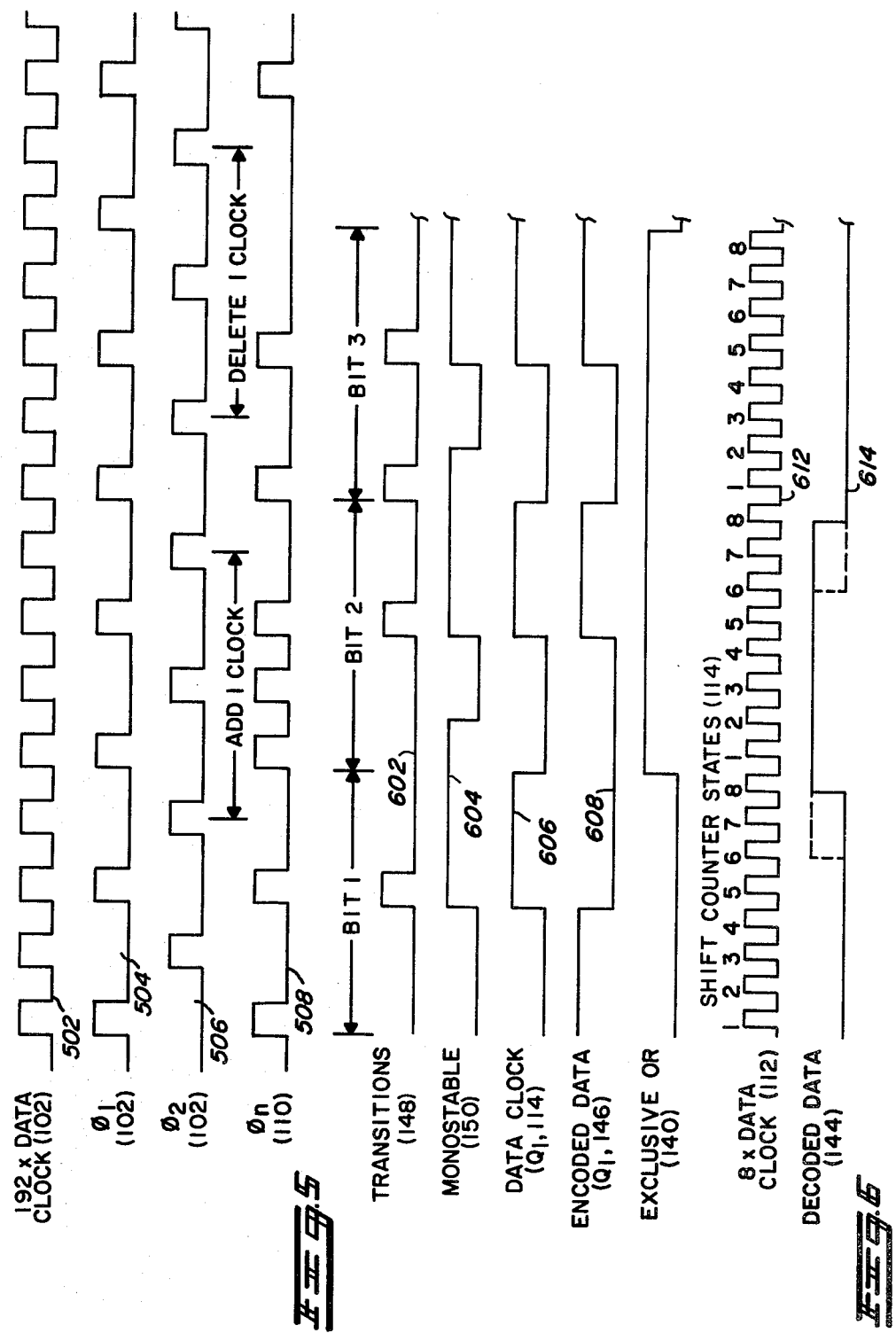

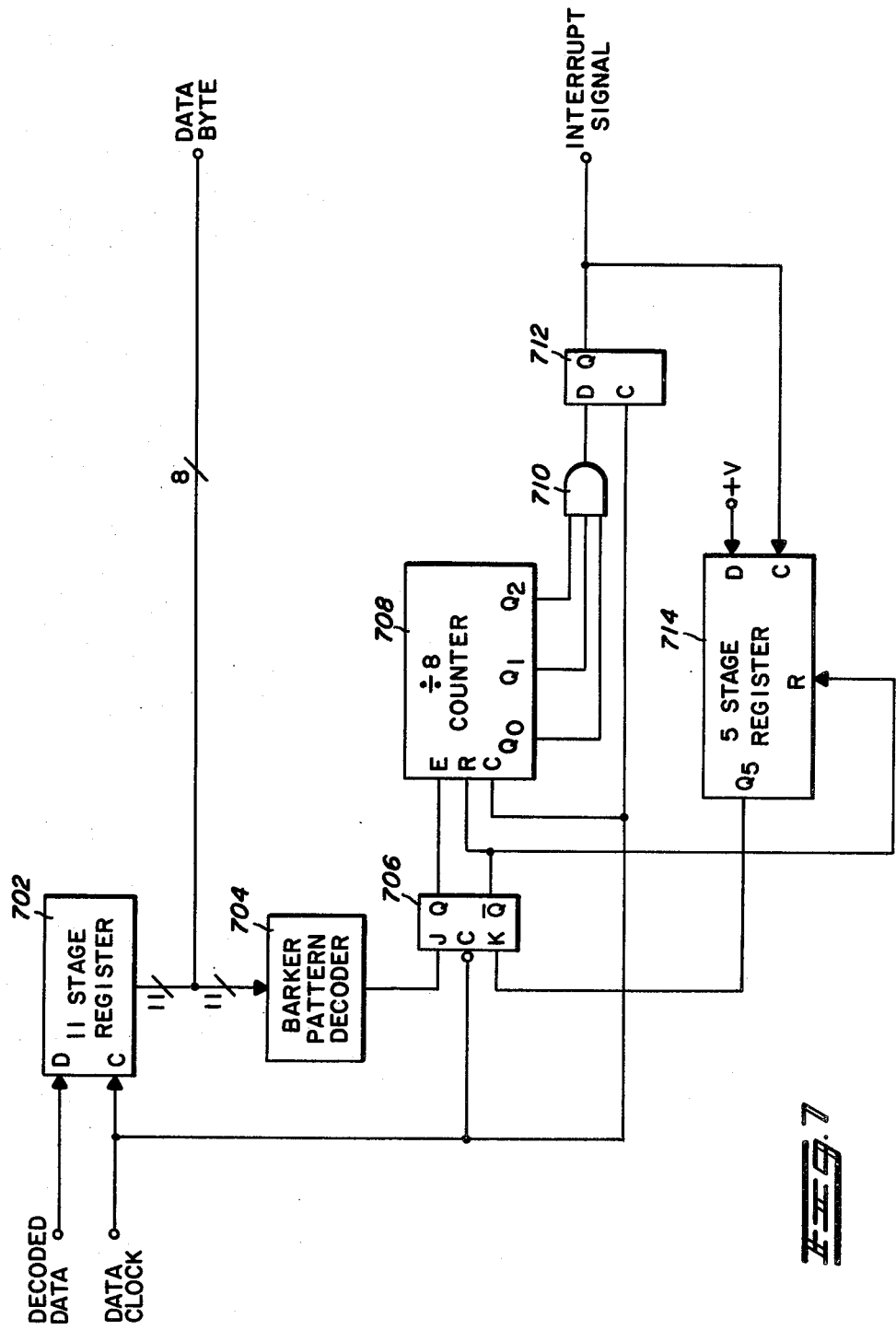

PHASE-ENCODED DATA SIGNAL DEMODULATOR

BACKGROUND OF THE INVENTION

The present invention relates generally to data signal demodulators, and more particularly to phase-encoded data signal demodulators that may be advantageously utilized for demodulating phase-encoded data signals transmitted on a noisy communication channel, such as a radio channel found in some mobile and portable radio telephone communication systems.

One of the many different prior phase-shift keying techniques is the well known "Manchester" coding technique, in which a logical one signal is characterized by a negative going transition at the mid-bit position, and a logical zero signal is characterized by a positive going transition at the mid-bit position of the encoded data signal. In prior communication systems utilizing the Manchester coding technique, a phase-encoded data signal typically includes a data word preceded by a bit synchronization word, as illustrated in FIG. 2. The bit synchronization word may be a one-zero dotting pattern having only mid-bit transitions for synchronizing a receiving demodulator. Upon synchronization to the phase-encoded data signal, prior demodulators have utilized various techniques for demodulating the phase-encoded data signal. For example, a matched filter may be utilized. In a matched filter, the phase-encoded data signal is coupled through integrate and dump circuitry operating at the data signal bit frequency, which integrates the phase-encoded data signal to provide a waveform that may be sampled near the end of each bit interval to provide the decoded data signal. Because sampling must be precisely performed, a matched filter is not well suited for demodulating phase-encoded data signals transmitted on noisy communication channels, since spurious noise signals may interfere wtih precise synchronization to the phase-encoded data signal resulting in skewed sampling.

According to another prior demodulating technique, the phase-encoded data signal may be sampled at a frequency much higher than its bit frequency. The phase-encoded data signal may then be decoded by ascertaining the order in which a number of consecutive samples are detected above a positive threshold and a number of consecutive samples are detected below a negative threshold. In a modification of this demodulating technique, one sample may be taken at the mid-position of the first half and the mid-position of the second half of each data bit, and compared in order to determine the logical state of the phase-encoded data signal. However, the foregoing sampling demodulators are likewise not well suited for demodulating phase-encoded data signals transmitted on noisy communication channels, since spurious noise signals may result in erroneous samples.

SUMMARY OF THE INVENTION

Accordingly, it is an object of the present invention to provide an improved phase-encoded data signal demodulator that reliably demodulates phase-encoded data signals transmitted on noisy communication channels.

It is another object of the present invention to provide an improved phase-encoded data demodulator that demodulates phase-encoded data signals transmitted on noisy communication channels by variably weighting samples of the phase-encoded data signal taken over each bit interval.

In practicing the present invention, a demodulator is provided for demodulating a phase-encoded data signal, transmitted at a predetermined bit frequency, to provide a decoded data signal having a non-return to zero (NRZ) data format. The demodulator includes circuitry for generating a data clock signal and phase locking the generated data clock signal to the phase reversals of the phase-encoded data signal. When utilizing the Manchester coding format, the phase reversals indicating logical state changes of the phase-encoded data signal result in mid-bit transitions. The data clock signal is provided with successive cycle intervals at the predetermined bit frequency, such that each clock cycle interval corresponds to a data bit interval. The demodulator further includes circuitry for multiplying the phase-encoded data signal and the clock signal to provide an output signal having first and second states. The multiplying circuitry output signal is sampled by further circuitry a predetermined number of times during each clock cycle or bit interval. Additional circuitry weights each sample of the multiplying circuitry output signal occurring in the first half of each clock cycle interval according to corresponding predetermined weighting factors, and weights each sample of the multiplying circuitry output signal occurring in the second half of each clock cycle interval according to other corresponding predetermined weighting factors. Further circuitry totalizes the weighted samples of the multiplying circuitry output signal for each clock cycle interval and provides a first state of the decoded data signal for each clock cycle interval where the magnitude of totalized samples is at least as great as a predetermined threshold magnitude, and a second state of the decoded signal for each clock cycle interval where the magnitude of the totalized samples is less than the predetermined threshold magnitude. Thus, the phase-encoded data signal is demodulated by variably weighting samples of the multiplying circuitry output signal over each clock cycle or bit interval.

According to a further feature of the present invention, the weighting factors for samples of the multiplying circuitry output signal occurring in the second half of each clock cycle interval may be selected to be greater than the weighting factors for samples of the multiplying circuitry output signal occurring in the first half of each clock cycle interval, in order to take advantage of any existent improvement in signal-to-noise ratio of the phase-encoded data signal occuring in the second half of each clock cycle interval and vice versa. The inventive phase-encoded data signal demodulator may be advantageously utilized in mobile and portable stations of a radio communication system where high speed phase-encoded data signals are transmitted over radio channels which tend to be noisy due to fading and other radio-frequency interference.

BRIEF DESCRIPTION OF THE DRAWINGS

FIG. 5 illustrates the signal waveforms associated with the two-phase clock generator in FIG. 1.

FIG. 6 illustrates the signal waveforms of various blocks of the demodulator in FIG. 1 for a typical phase-encoded data waveform.

FIG. 7 is a detailed circuit diagram of circuitry for detecting the Barker word preceding each data word in the data signal in FIG. 2, and providing an interrupt signal for each eight-bit byte of the following data word.

FIG. 8 is a block diagram of a radio communication system which may advantageously utilize the phase-encoded data signal demodulator in FIG. 1.

DETAILED DESCRIPTION OF THE PREFERRED EMBODIMENT

Figure 1:
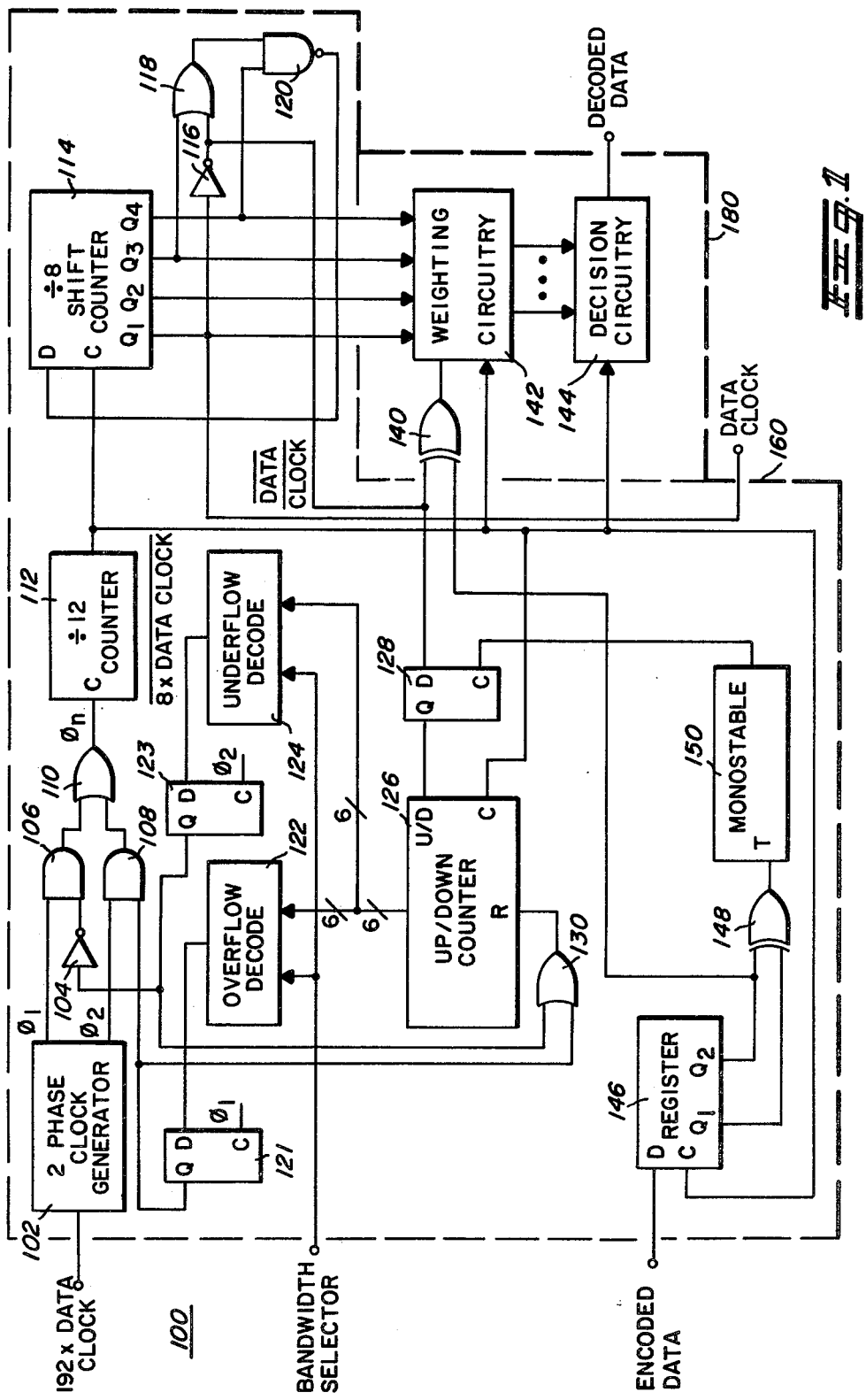
FIG. 1 is a block diagram of a phase-encoded data signal demodulator embodying the present invention.
Figure 2:
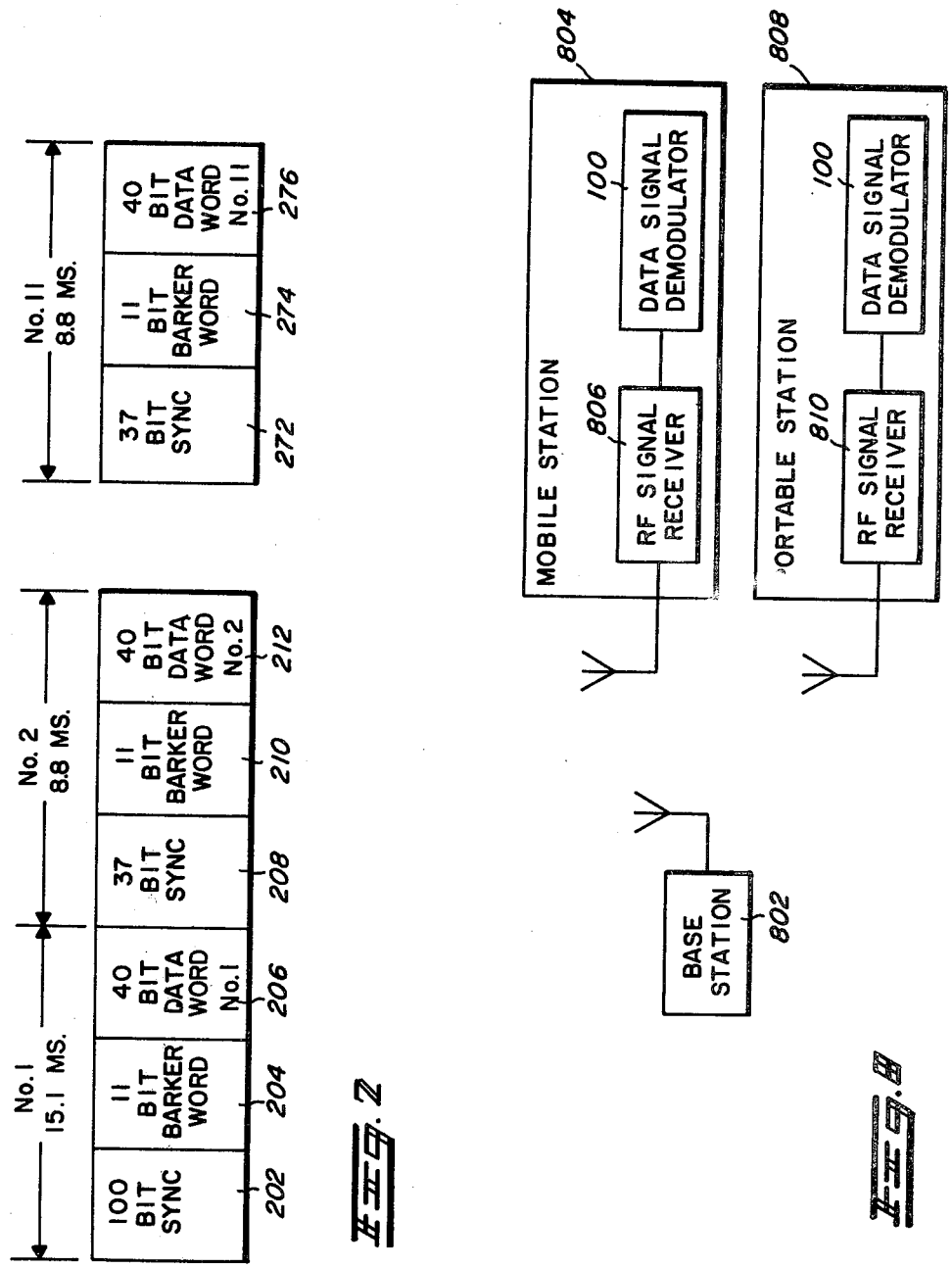
FIG. 2 illustrates a prior art format of a phase-encoded data signal which may be demodulated by the demodulator in FIG. 1.

In FIG. 1, there is illustrated a phase-encoded data signal demodulator embodying the present invention. The demodulator 100 is particularly well adapted for demodulating data signals coded according to the well known Manchester coding format. The arrangement of a typical phase-encoded data signal that utilizes the Manchester coding format is shown in FIG. 2. The data signal of FIG. 2 has a bit frequency of 10 KHz and includes eleven repeats of a data word 206, 212 and 276, each preceded by a Barker word 204, 210 and 274 and a bit synchronization word 202, 208 and 272, respectively. The bit synchronization word 202, 208 and 272 is typically a one-zero dotting pattern, which when coded according to the Manchester coding format results in a signal having a frequency of one-half of the bit frequency and having transitions only at the mid-bit position. Because there are only mid-bit transitions, the demodulator 100 may be readily synchronized to the bit synchronization word. Once synchronized to the mid-bit transitions of the bit synchronization word, the demodulator 100 will be kept in synchronization by the mid-bit transitions within the following Barker and data words. Further circuitry in the demodulator may then be utilized to detect the Barker word, which has a highly correlatable bit pattern that identifies the beginning of the following data word. An exemplary embodiment of circuitry for detecting the Barker word is illustrated in FIG. 7 and is described in further detail hereinbelow. After detection of the Barker word, the following data word may then be processed by other circuitry not illustrated herein. For example, the data words may be correlated and processed by the data signal detector described in the instant assignee's co-pending application, Ser. No. 119,605, entitled "Improved Method and Apparatus for Detecting a Data Signal Including Repeated Data Words," invented by Kenneth A. Felix and James A. Pautler and filed the same date as the instant application. Further features and details of the data signal illustrated in FIG. 2 are provided in U.S. Pat. No. 4,029,900.

A data signal demodulator 100 embodying the present invention may be advantageously utilized in radio communication systems such as that shown in FIG. 8. In some radio communication systems, it is desirable to communicate high speed data signals from a base station 802 to mobile and portable stations 804 and 808 by way of radio communication channels. Fading and interference is typically encountered in such radio communication systems in part because the radio path between the base station 802 and the mobile and portable stations 804 and 808 may be intermittently blocked by intervening objects. Thus, it is desirable to have a data signal demodulator 100 that reliably demodulates high speed data signals transmitted over noisy radio channels in these radio communication systems. The data signal demodulator 100 of the present invention may be coupled to the output from conventional RF signal receivers 806 and 810 in the mobile and portable stations 804 and 808 for providing the reliable data signal demodulation necessary in these radio communication systems.

Referring to FIG. 1, data signal demodulator 100 includes a digital phase-locked loop 160 for generating a data clock signal that is phase locked to the mid-bit transitions of the phase-encoded data signal, and demodulating circuitry 180 for demodulating the phase-encoded data signal to provide a non-return to zero (NRZ) decoded data signal. The digital phase-locked loop 160 must be phase locked to the mid-bit transitions of the phase-encoded data signal in order to properly demodulate it. Since the bit synchronization word of the data signal is comprised entirely of mid-bit transitions, the digital phase-locked loop 100 is assured to be in synchronism with the mid-bit transitions by the time that the following Barker and data words are received.

In digital phase-locked loop 160, two-phase clock generator 102 is responsive to a clock signal provided by a clock signal source (not illustrated), having a frequency at a multiple of the data signal frequency, which, in the preferred embodiment is 1.92 MHz, for providing two clock signals $\phi_1$ and $\phi_2$, phased at 90 degrees with respect to one another and each having a frequency of 960 KHz. The clock signals from the two-phase clock generator 102 are coupled by gates 106, 108 and 110 to provide the clock signal $\phi_n$ to counter 112. Typical waveforms for the clock signals, $\phi_1$, $\phi_2$ and $\phi_n$, are provided in FIG. 5. In the absence of phase corrections, the clock signal $\phi_n$ is the same as clock signal $\phi_1$. Phase corrections of the data clock signal are accomplished by adding to $\phi_n$ an additional clock pulse from clock signal $\phi_2$ to advance the phase of the 10 KHz data clock signal frequency and by deleting from $\phi_n$ a clock pulse of the $\phi_1$ clock signal to retard the phase of the 10 KHz data clock signal, the operation of which is illustrated by the waveforms in FIG. 5.

Counter 112 divides the $\phi_n$ clock signal by twelve to provide a clock signal having a frequency of 80 KHz. The 80 KHz clock signal from counter 112 is coupled to shift counter 114, which divides the 80 KHz clock signal by eight to provide the 10 KHz data clock signal at its Q1 output. Shift counter 114 also provides outputs Q1-Q4, for establishing eight sample intervals for the demodulating circuitry 180, as explained hereinbelow with reference to Table 1.

The phase correction of the digital phase-locked loop 160 is accomplished by means of phase comparing flip-flop 128, up/down counter 126 and overflow and underflow decoding circuitry 122 and 124. Each transition of the phase-encoded data signal is transformed into a pulse signal by register 146 and exclusive OR gate 148. The pulse signals from exclusive OR gate 148 trigger monostable 150, which provides an output signal having a time duration that is greater than one-half cycle interval of the data clock signal, as illustrated by the corresponding waveforms in FIG. 6. Thus, when the digital phase-locked loop 160 is synchronized to the mid-bit transitions, monostable 150 will not be retriggered by bit transitions which may occur at the beginning of a bit interval. Once the digital phase-locked loop 160 has been locked to the mid-bit transitions of the bit synchronization word, monostable 150 will only be triggered by succeeding mid-bit transitions of the Barker and data words.

Each pulse output signal from monostable 150 clocks the state of the complemented data clock into phase comparing flip-flop 158. The Q output of phase comparing flip-flop 128 is coupled to up/down counter 126 for controlling whether counter 126 counts up or down at the 80 KHz data clock signal frequency. If the Q output of phase comparing flip-flop 128 has a logical one state, counter 126 will count up until it reaches a preselected state that is detected by overflow decoding circuitry 122, which causes by way of flip-flop 121 the addition of a $\phi_2$ clock pulse for appropriately adjusting the phase of the 10 KHz data clock signal. Similarly, if the Q output of phase comparing flip-flop 128 has a logical zero state, counter 126 counts down until a preselected state is detected by underflow decoding circuitry 124, which causes by way of flip-flop 123 a $\phi_1$ clock pulse to be deleted for appropriately adjusting the phase of the 10 KHz data clock signal. Both the outputs from flip-flops 121 and 124 are coupled by way of OR gate 130 for resetting counter 126 to a predetermined initial state. The rate at which phase adjustments are made to the 10 KHz data clock signal is determined by the preselected states that are decoded by overflow decoding circuitry 122 and underflow decoding circuitry 124. The rate at which phase adjustments are made can be changed by varying the state at which an overflow or underflow is detected by means of the bandwidth select signal. If narrow bandwidth operation is desired, a first state of the bandwidth select signal may provide that overflow and underflow conditions are detected at a state representative of a relatively high totalized count. Conversely, if wide bandwidth operation is desired, a second state of the bandwidth select signal may provide that overflow and underflow conditions are detected at a state representative of a relatively low totalized count. By utilizing the bandwidth select signal, the rate at which digital phase-locked loop 160 locks to the bit transitions of the phase-encoded data signal may be adjusted up or down depending on the format of the data signal and the characteristics of the particular communication channel utilized.

Referring to the demodulating logic 180 in FIG. 1, the complemented data clock signal and the reclocked phase-encoded data signal from register 146 are exclusive OR'd by gate 140 and coupled to weighting circuitry 142, which takes eight samples and weights the samples according to predetermined weighting factors, such as those in Table I. The weighted samples are then totalized by the decision circuitry 144, which may provide a first state of the decoded data signal for each clock cycle interval where the magnitude of the totalized samples is at least as great as a predetermined threshold magnitude, and a second state of the decoded data signal for each clock cycle interval where the magnitude of the totalized samples is less than the predetermined threshold magnitude. Thus, according to an important feature of the present invention, the weighting factors and the threshold magnitude may be varied to adapt the demodulating circuitry 180 to the particular characteristics of the phase-encoded data signal to be demodulated.

Figure 3:
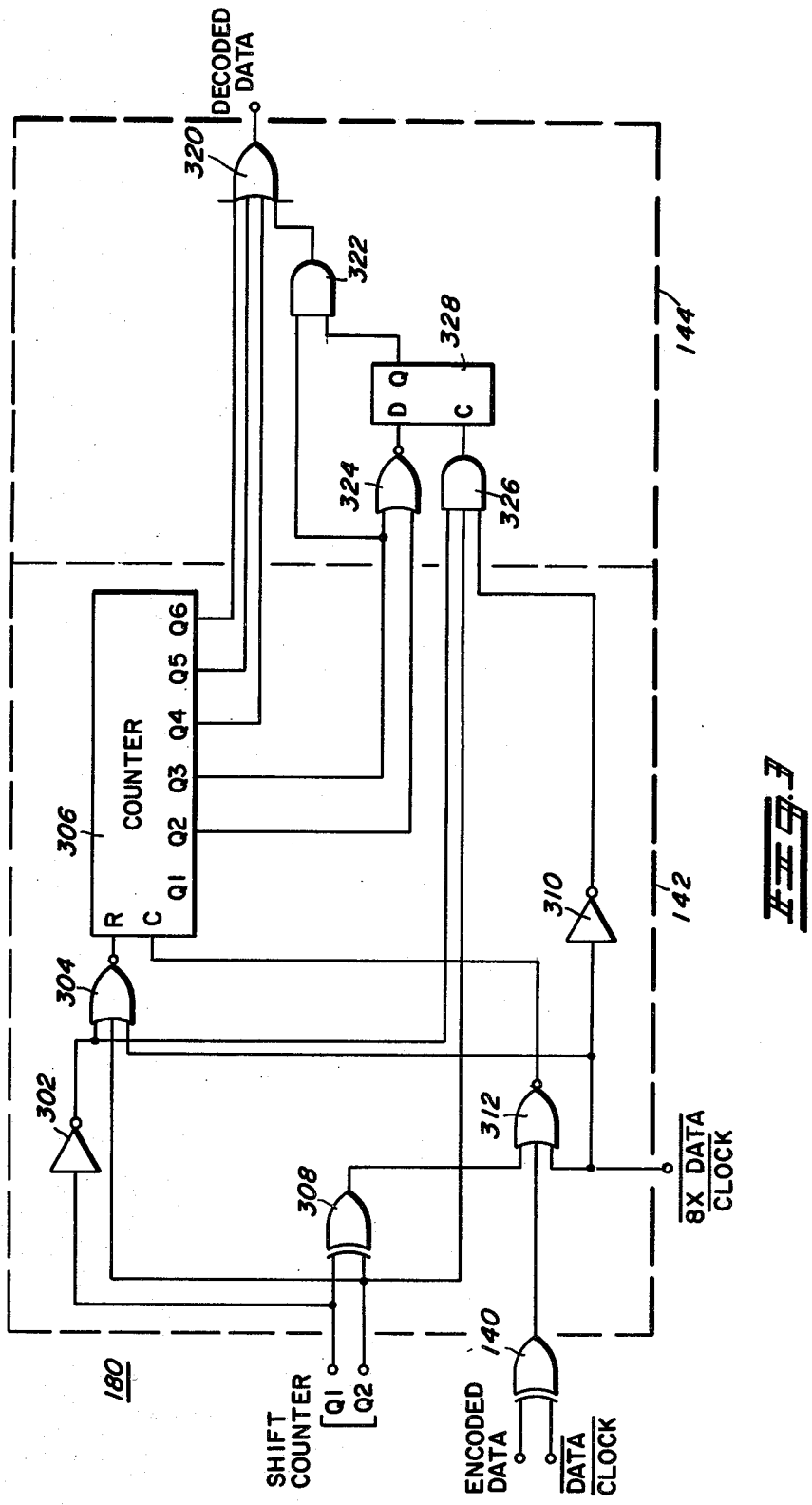
FIG. 3 is a detailed circuit diagram of an embodiment of the demodulating circuitry in FIG. 1.

In FIG. 3, there is illustrated one embodiment of the demodulating circuitry 180, for which typical waveforms associated with some blocks are illustrated in FIG. 6. The demodulating circuitry 180 in FIG. 3 samples the signal from exclusive OR gate 140 eight times and weights the samples according to the binary weighting factors in Table I. The weighting circuitry 142 includes a counter 306 which is reset for the first sample interval by gate 304 and thereafter is enabled to count for sample intervals 2, 3, 4, 6, 7 and 8 by exclusive OR gate 308. The counter 306 is incremented during sample intervals 2-4 and 6-8 of the encoded data bit has a logical one state. Thus, counter 306 is incremented by one for each sample interval 2-4 in the first half of a bit interval for a logical one data bit and incremented by one count for each sample interval 6-8 during the second half of a bit interval likewise for a logical one data bit.

The totalized counts from counter 306 are applied to decision circuitry 144 which provides the NRZ decoded data signal at gate 320 with a logical one state if the totalized count is four, five or six, or if the totalized count is three and at least two of the counts were from sample intervals 6, 7 or 8 in the second half of a bit interval. Otherwise, the NRZ decoded data signal provided at gate 320 has a logical zero state. In order to provide the foregoing operation, decision circuitry 144 includes flip-flop 328 for storing whether or not a count of two or three occurred during the first half of a bit interval. If a count of two or three occurred during the first half of a bit interval, the Q output of flip-flop 328 is clocked to a logical zero state for blocking AND gate 322. Then, if a total count of three occurs in the second half of the bit interval, AND gate 322 is blocked resulting in a logical zero state for the NRZ decoded data signal. Alternatively, if none or one count occurs during sample intervals 2, 3 or 4 in the first half of a bit interval, flip-flop 328 will be clocked to a logical one state to enable AND gate 322. Then, if a total count of three occurs during the second half of the bit interval, AND gate 322 is enabled by the Q3 output of counter 306 to provide via OR gate 320 a logical one state for the NRZ decoded data signal. Thus, in accordance with the present invention, samples occurring during the second half of a bit interval are weighted more heavily than samples occurring during the first half of that bit interval when there is a totalized count of three out of a possible maximum totalized count of six in counter 306.

Figure 4:
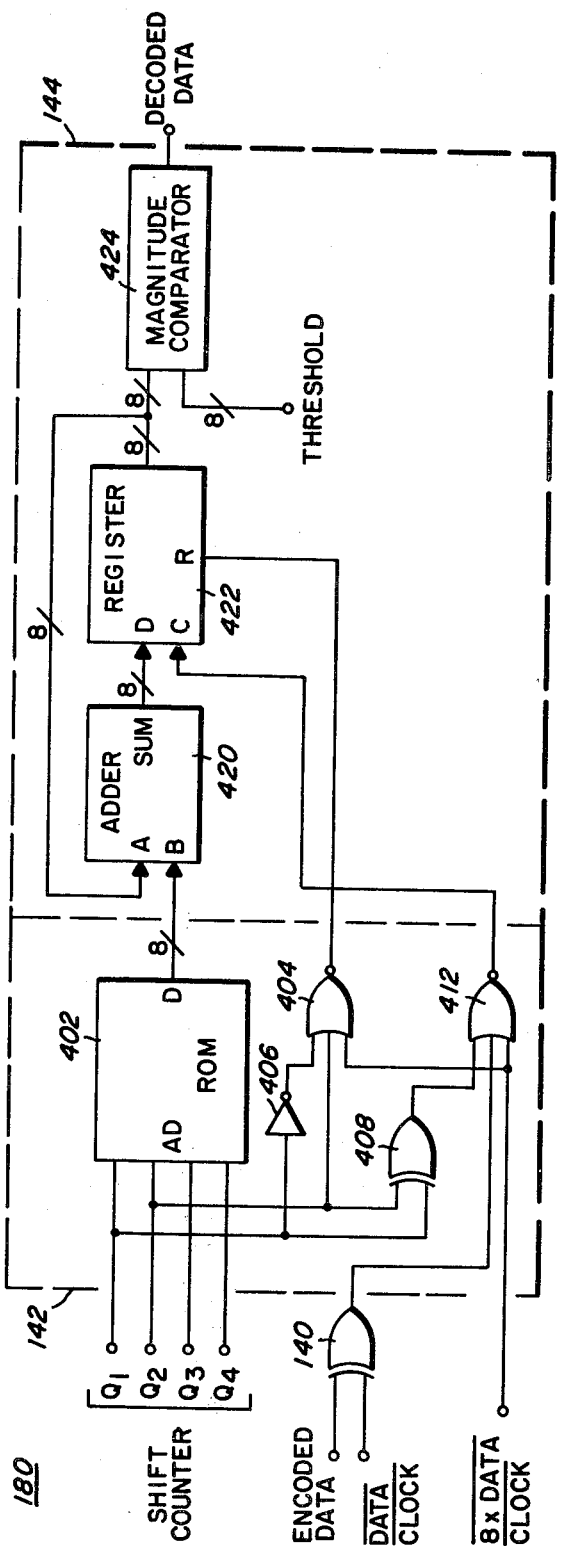
FIG. 4 is a detailed circuit diagram of another embodiment of the demodulating circuitry in FIG. 1.

Many other variations may be devised where samples taken during the first or second half of a bit interval are assigned different weighting factors than samples taken during the second or first half of a bit interval, respectively. For example, in another embodiment of the demodulating circuitry 180 shown in FIG. 4, the eight samples taken during each bit interval are weighted according to the sine weighting factors in Table I. In the case of sine weighting, sample intervals 1 and 5 are likewise weighted with a value of zero, since the sine of 0° and 180° is zero. The maximum magnitude of the weighting factors for sample intervals 2, 3 and 4 has been assigned the value of fifteen. Therefore, sample interval 3 has been assigned a value of fifteen since the sine of 90° is one, while sample intervals 2 and 4 have been assigned the value of ten since the sine of 45° and 135° is 0.7. The values for the second half of a bit interval have been derived in a similar manner assuming a maximum value of twenty. The sine weighted values in Table I for each of the sample intervals may then be stored in ROM 402 at locations addressed by the shift counter outputs Q1, Q2, Q3 and Q4.

The sine weighted values are read out from ROM 402 in response to the shift counter outputs Q1–Q4 and applied to decision circuitry 144, which totalizes the read-out values and compares them to a predetermined threshold value. Adder 420 and register 422 form an accumulator which is clocked by a clock signal provided by gate 412, which is identical to the clock signal provided at gate 312 in FIG. 3. Register 422 is initially reset at the first sample interval by gate 404 and thereafter clocked for sample intervals 2–4 and 6–8 by gate 412 for accumulating the non-zero sine weighting factors if samples of the phase-encoded data signal from exclusive OR gate 140 indicate a logical one bit. When the accumulated sum becomes greater than the threshold value, magnitude comparator 424 provides a logical one for the NRZ decoded data signal. Since, for both embodiments of the demodulating circuitry 180 illustrated in FIGS. 3 and 4, the NRZ decoded data signal has a valid logical state only near the end of each bit interval (See waveforms in FIG. 6), the NRZ decoded data signal may be reclocked by the data clock signal for providing a waveform that changes states at the beginning of each bit interval, before application of the NRZ decoded data signal to other circuitry.

The threshold value for magnitude comparator 424 may be set at any suitable value depending on the desired preformance of demodulating circuitry 180. For example, since the maximum value that may be accumulated in register 422 is 83 for the sine weighting factors in Table I, the threshold value may be set at approximately one-half of the maximum value which here is approximately 42. If the threshold value is set at 42, the NRZ decoded data signal will have a logical one state if any four, five or six sample intervals are totalized, or two of sample intervals 6, 7 and 8 and one of sample intervals 2, 3 and 4 are totalized, or if sample intervals 2 and 3 or 3 and 4 and sample 7 are totalized. Thus, in accordance with the present invention, not only the weighting factors for each of the samples may be varied, but also the threshold value for detection may likewise be varied depending on the characteristics of the phase-encoded data signal that is to be demodulated.

Referring to FIG. 7, there is illustrated circuitry for detecting the Barker word and thereafter providing an interrupt signal when each eight-bit byte of the following data word is loaded into register 702. Register 702 provides for storage of up to eleven bits in order to detect the particular pattern of the Barker word, while also reclocking the NRZ decoded data signal and providing eight-bit parallel bytes of each data word. The interrupt signal and eight-bit bytes of each data word may be advantageously utilized by other circuitry (not illustrated), such as, for example, the data signal detector in the instant assignee's aforementioned co-pending patent application, Ser. No. 119,605.

Decoding circuitry 704 is continuously monitoring the eleven data bits stored in shift register 702 for the particular Barker word bit pattern. Upon detection of the Barker word bit pattern, decoding circuitry 704 enables the J input of flip-flop of 704. The Q output of flip-flop 706 is subsequently clocked to a logical one state for enabling counter 708. Counter 708 counts the next eight clock cycle intervals for determining when each eight-bit byte of the following data word has been shifted into shift register 702. When each eight-bit byte of a data word has been shifted into shift register 702, the Q output of flip-flop 712 is clocked to a logical high state to provide an interrupt signal having a time duration of one clock cycle interval. The interrupt signal from flip-flop 712 is coupled to five-stage shift register 714 for serially clocking into register 714 a logical high pulse, which is shifted to output Q5 when five interrupt signals have been provided. It is necessary to provide five interrupt signals since each data word includes five eight-bit bytes. The Q output of flip-flop 706 is clocked to a logical zero state when its K input is enabled by the Q5 output of shift register 714, indicating that five interrupt signals have been provided. The foregoing operation is repeated whenever the particular pattern of the Barker word is detected in the NRZ decoded data signal. Since a communication channel may contain both voice and data signals, it is possible to falsely detect the Barker word bit pattern and treat the following forty bits as a data word. However, when using the signalling format illustrated in FIG. 2, the invalid data word resulting from the false Barker word detection, may be identified and ignored by utilizing the invention described in the aforementioned co-pending patent application, Ser. No. 119,605.

The various circuitry of the embodiments of the phase-encoded signal demodulator shown in FIGS. 1, 3, 4 and 7 may be implemented by utilizing conventional digital integrated circuits, such as those described in the "CMOS Integrated Circuits Data Book," published by Motorola Semiconductor Products, Inc., Austin, Tex., 1978. Furthermore, the illustrative circuitry in FIGS. 1, 3, 4 and 7 may be readily integrated into a single semi-conductive substrate utilizing conventional integrated circuit techniques well known in the art.

In summary, an improved phase-encoded data signal demodulator has been described that is particularly well adapted for demodulating phase-encoded data signals transmitted on noisy communication channels, such as, for example, radio channels of radio communication systems. The inventive demodulator samples the phase-encoded data signal a predetermined number of times during each bit interval thereof. The samples may then be variably weighted and totalized for comparison with a preselected threshold value for determining the logical state of each bit of the phase-encoded data signal. For example, the samples may be sine weighted and summed, and the totalized sum compared to the threshold value. If the totalized sum is greater than or equal to the threshold value, a first state of the decoded data signal may be provided. Otherwise, if the totalized sum is less than the threshold value, a second state of the decoded data signal is provided. Thus, in accordance with the present invention, the number of samples per bit interval, the weighting factors for each of the samples and the threshold value may be varied so that the inventive phase-encoded data signal demodulator may be adapted to accommodate the particular characteristics of the phase-encoded data signal and the communication channel on which it is transmitted.

TABLE 1

| | SHIFT COUNTER STATES | | | | | |
|---|---|---|---|---|---|---|
| SAMPLES | Q1 | Q2 | Q3 | Q4 | BINARY WEIGHTING | SINE WEIGHTING |
| 1. | 1 | 0 | 0 | 0 | 0 | 0 |

TABLE 1-continued

| | SHIFT COUNTER STATES | | | | BINARY WEIGHTING | SINE WEIGHTING | |
|---|---|---|---|---|---|---|---|
| SAMPLES | Q1 | Q2 | Q3 | Q4 | | | |
| 2. | 1 | 1 | 0 | 0 | 1 | 10 | FIRST HALF CYCLE |
| 3. | 1 | 1 | 1 | 0 | 1 | 15 | |
| 4. | 1 | 1 | 1 | 1 | 1 | 10 | |
| 5. | 0 | 1 | 1 | 1 | 0 | 0 | SECOND HALF CYCLE |
| 6. | 0 | 1 | 1 | 1 | 1 | 14 | |
| 7. | 0 | 0 | 0 | 1 | 1 | 20 | |
| 8. | 0 | 0 | 0 | 0 | 1 | 14 | |

We claim:

1. A demodulator for a phase-encoded data signal transmitted by a signal source at a predetermined bit frequency, comprising:
   means for generating a data clock signal, having successive cycle intervals at the predetermined bit frequency, and phase locking the generated data clock signal to the phase reversals of the phase-encoded data signal;
   means for multiplying the phase-encoded data signal and the data clock signal to provide an output signal having first and second states;
   means for sampling the state of the multiplying means output signal a predetermined number of times during each clock cycle interval to provide successive samples of the multiplying means output signal;
   means for weighting each sample of the multiplying means output signal occurring in the first half of each clock cycle interval according to corresponding predetermined weighting factors, and weighting each sample of the multiplying means output signal occurring in the second half of each clock cycle interval according to corresponding predetermined weighting factors; and
   means for totalizing the weighted samples of the multiplying means output signal for each clock cycle interval and providing a decoded data signal having a first state for each clock cycle interval where the magnitude of the totalized samples is at least as great as a predetermined threshold magnitude, and having a second state for each clock cycle interval where the magnitude of the totalized samples is less than the predetermined threshold magnitude.

2. The demodulator according to claim 1, wherein the predetermined weighting factors for samples occurring in the second half of each clock cycle interval have a magnitude greater than that of the predetermined weighting factors for samples occurring in the first half of each clock cycle interval.

3. The demodulator according to claim 1, wherein the predetermined weighting factors for samples occurring in the first half of each clock cycle interval have a magnitude greater than that of the predetermined weighting factors for samples occurring in the second half of each clock cycle interval.

4. The demodulator according to claim 1, 2 or 3, wherein the predetermined weighting factors are sine weighted over the first half of each clock cycle interval and over the second half of each clock cycle signal.

5. The demodulator according to claim 1, wherein said data clock signal generating and phase-locking means comprises a signal source for providing a reference clock signal having a frequency that is a preselected multiple of the predetermined bit frequency, and digital phase-locked loop means coupled to the reference clock signal and phase-encoded data signal for providing the phase-locked data clock signal.

6. The demodulator according to claim 1, wherein said weighting means includes memory means for storing the predetermined weighting factors for each sample, the weighting means responsive to each sample for reading out of the memory means its corresponding predetermined weighting factor.

7. The demodulator according to claim 1 or 6, wherein said totalizing means includes register means for storing the totalized samples during each clock cycle interval and adding means for successively adding each weighted sample to the totalized samples stored in the register means.

8. The demodulator according to claim 1, wherein said totalizing means totalizes the weighted samples from the first half and from the second half of each cycle interval and provides a decoded data signal having a first state for a clock cycle interval when the magnitudes of the totalized samples for both the first and second halves of the clock cycle interval are at least as great as first and second predetermined threshold magnitudes, respectively, and provides a decoded data signal having a second state when the magnitudes of the totalized samples for at least one of the first and second halves of the clock cycle interval is less than the first and second predetermined threshold magnitudes, respectively.

9. The demodulator according to claim 1, 2, 3, 5, 6 or 8 adapted for use in mobile and portable stations of a radio communication system, having at least one radio channel, for demodulating phase-encoded data signals transmitted on the radio channel.

10. A demodulator for a phase-encoded data signal transmitted by a signal source at a predetermined bit frequency, comprising:
   signal source means for generating a reference clock signal;
   digital phase-locked loop means responsive to the reference clock signal for generating a data clock signal, having successive clock cycle intervals at the predetermined bit frequency, and phase-locking the generated data clock signal to the phase reversals of the phase-encoded data signal;
   means for multiplying the phase-encoded data signal and the data clock signal to provide an output signal having first and second states;
   means for sampling the state of the multiplying means output signal a predetermined number of times during each clock cycle interval to provide successive samples of the multiplying means output signal;
   means for counting for each bit interval the samples of the multiplying means output signal having the first state and providing a totalized count for the first half and second half of each clock cycle interval, and means for providing a decoded data signal having a first state for each clock cycle interval where the magnitudes of the totalized counts for the first half and second half of a clock cycle interval is at least as great as a first and second predetermined threshold magnitude, respectively, and having a second state for each clock cycle interval where the magnitudes of the totalized counts for at least one of the first half and second half of a clock cycle interval is less than the first and second predetermined threshold magnitudes, respectively.

11. A demodulator for a phase-encoded data signal transmitted by a signal source at a predetermined bit frequency, comprising:

signal source means for generating a reference clock signal;

digital phase-locked loop means responsive to the reference clock signal for generating a data clock signal, having successive clock cycle intervals at the predetermined bit frequency, and phase-locking the generated data clock signal to the phase reversals of the phase-encoded data signal;

means for multiplying the phase-encoded data signal and the data clock signal to provide an output signal having first and second states;

means for sampling the state of the multiplying means output signal N times during the first and second half of each clock cycle interval to provide successive samples of the multiplying means output signal, where N is an integer number greater than two (2);

means for counting for each bit interval the samples of the multiplying means output signal having the first state and providing a totalized count for the first half and the combined first and second halves of each clock interval; and means for providing a decoded data signal having a first state for each clock interval where the magnitude of the totalized count for the combined first and second halves of a clock cycle interval is greater than N and where the totalized count for the combined first and second halves of a clock cycle interval is N and the totalized count for the first half of the clock cycle interval is less than one-half N, and having a second state for each clock cycle interval where the magnitude of the totalized count for the combined first and second halves of a clock cycle interval is less than and where the totalized count for the first and second halves of a clock cycle interval is equal to N and the totalized count for the first half of the clock cycle interval is greater than one-half N.

12. The demodulator according to claim 11 adapted for use in mobile and portable stations of a radio communication system, having at least one radio channel, for demodulating phase-encoded data signals transmitted on the radio channel.

13. The demodulator according to claim 10 adapted for use in mobile and portable stations of a radio communication system, having at least one radio channel, for demodulating phase-encoded data signals transmitted on the radio channel.

14. A demodulator for a phase-encoded data signal transmitted by a signal source at a predetermined bit frequency, comprising:

signal source means for providing a reference clock signal;

digital phase-locked loop means responsive to the reference clock signal for generating a data clock signal, having successive clock cycle intervals at the predetermined bit frequency, and phase-locking the generated data clock signal to the phase reversals of the phase-encoded data signal;

means for multiplying the phase-encoded data signal and the data clock signal to provide an output signal having first and second states;

means for sampling the state of the multiplying means output signal a predetermined number of times during each clock cycle interval to provide successive samples of the multiplying means output signal;

means for storing a predetermined weighting factor associated with each sample taken during successively clock cycle intervals;

means responsive to each sample of the multiplying means output signal having the first state for reading out from the storing means the corresponding predetermined weighting factor;

means for totalizing the read-out predetermined weighting factors; and means for providing a decoded data signal having a first state for each clock cycle interval where the magnitude of the totalized weighting factors is at least as great as a predetermined threshold magnitude, and providing a second state for each clock cycle interval where the magnitude of the totalized weighting factors is less than the predetermined threshold magnitude.

* * * * *

UNITED STATES PATENT AND TRADEMARK OFFICE
CERTIFICATE OF CORRECTION

PATENT NO. : 4,302,845
DATED : November 24, 1981
INVENTOR(S) : MICHAEL J. McCLAUGHRY It is certified that error appears in the above—identified patent and that said Letters Patent is hereby corrected as shown below:

Column 11, line 50  insert "N" after "than"

Signed and Sealed this

Fourteenth Day of December 1982

[SEAL]

Attest:

GERALD J. MOSSINGHOFF

Attesting Officer    Commissioner of Patents and Trademarks